Figure 5:
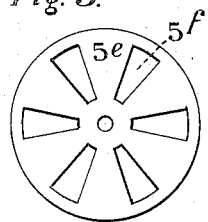

B. STRADOVSKY.
ROTARY ENGINE.
APPLICATION FILED APR. 10, 1911.
1,145,627.
Patented July 6, 1915.
4 SHEETS—SHEET 1.
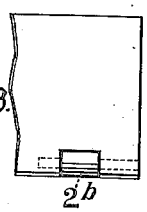
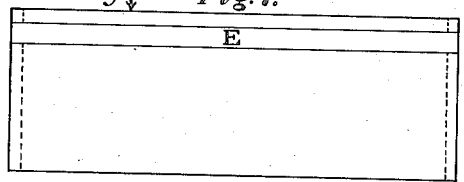
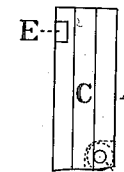
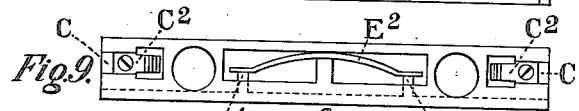
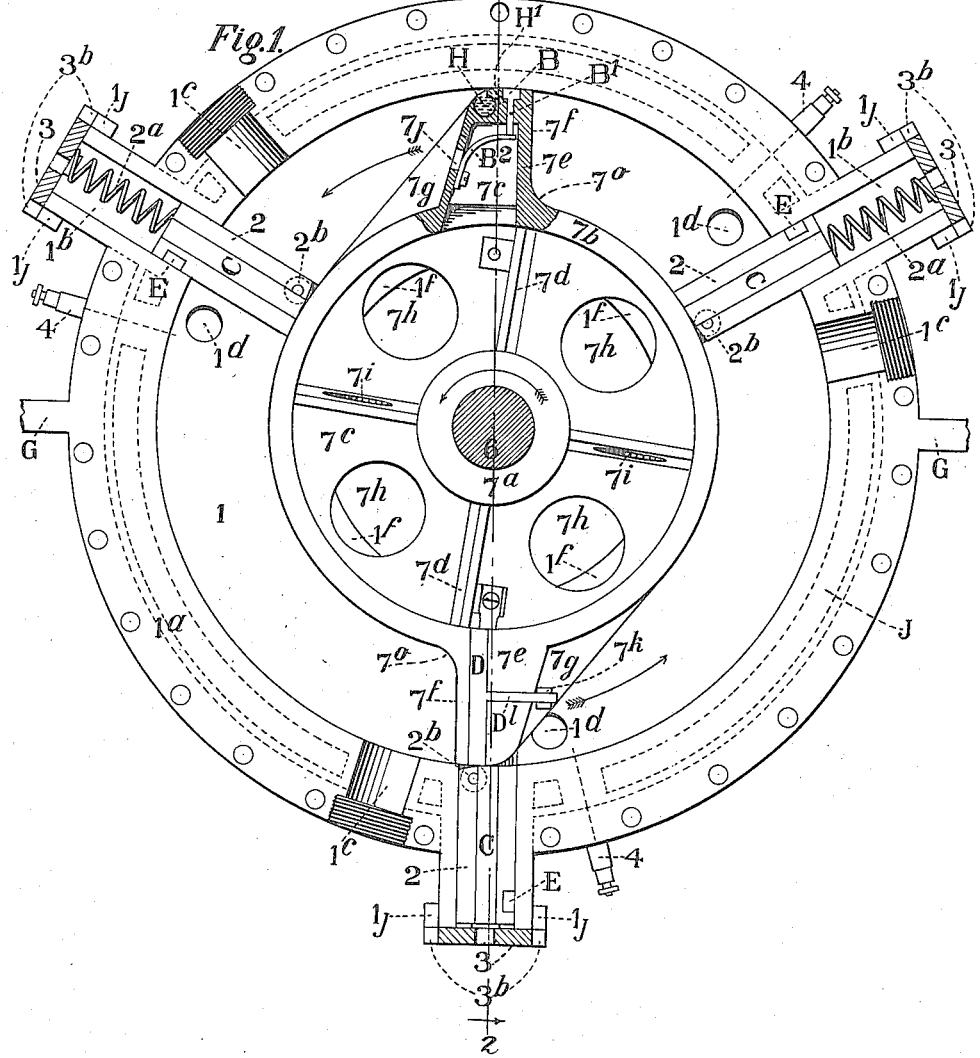

B. STRADOVSKY.
ROTARY ENGINE.
APPLICATION FILED APR. 10, 1911.
1,145,627.
Patented July 6, 1915.
4 SHEETS—SHEET 2.
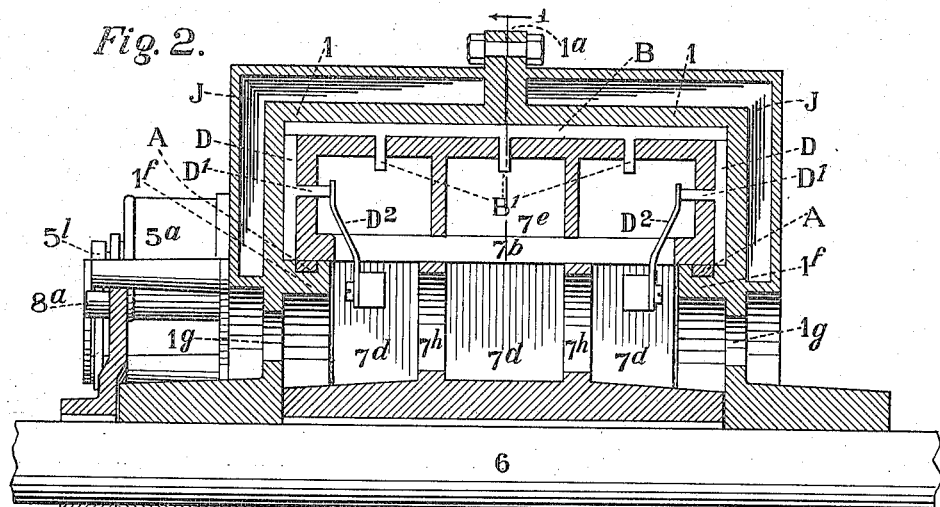
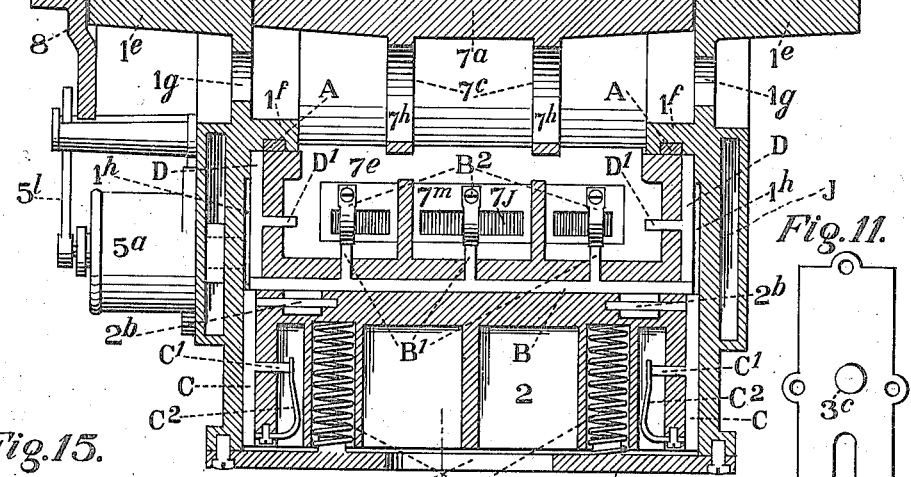
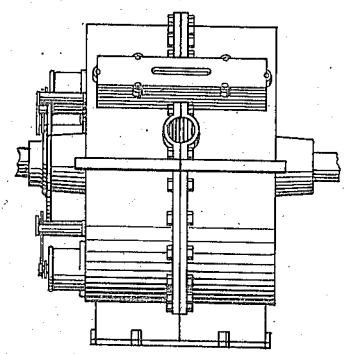
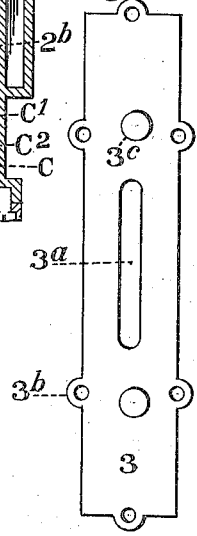
Witnesses:
Robt. N. Burton
Edna M. Macintosh
Inventor
Bohumil Stradovsky
By his Attorneys
Burton & Burton

B. STRADOVSKY.
ROTARY ENGINE.
APPLICATION FILED APR. 10, 1911.

1,145,627.

Patented July 6, 1915.
4 SHEETS—SHEET 3.

Witnesses:
Robt. M. Burton
Edna M. MacIntosh

Inventor
Bohumil Stradovsky
By his Attorneys
Burton & Burton

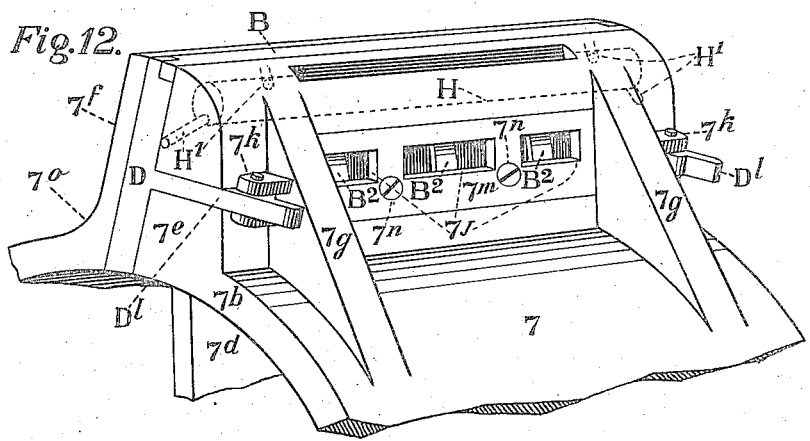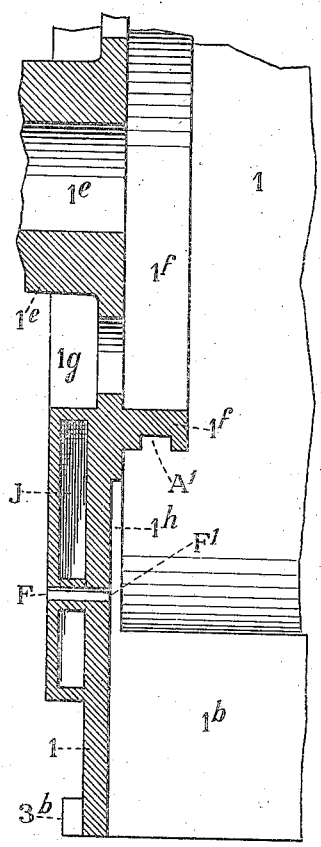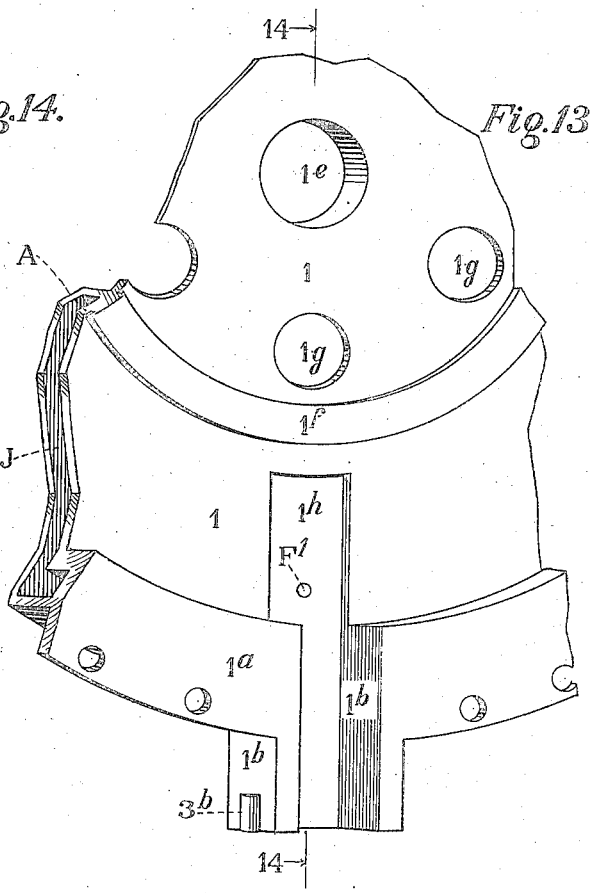

UNITED STATES PATENT OFFICE.

BOHUMIL STRADOVSKY, OF CHICAGO, ILLINOIS.

ROTARY ENGINE.

1,145,627.   Specification of Letters Patent.   Patented July 6, 1915.

Application filed April 10, 1911. Serial No. 619,935.

*To all whom it may concern:*

Be it known that I, BOHUMIL STRADOVSKY, a citizen of the United States, residing at 10100 Wallace street, Chicago, in the county of Cook and State of Illinois, have invented new and useful Improvements in Rotary Engines, of which the following is a specification, reference being had to the accompanying drawings, forming a part thereof.

This invention relates to an improved type of rotary engine adapted to employ a volatile and explosive motive fluid.

It consists of the features and elements described and shown in the drawings as indicated in the claims.

Figure 6:
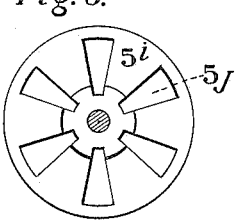
Figure 4:
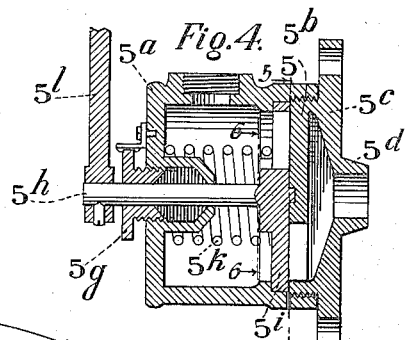
Figure 3:
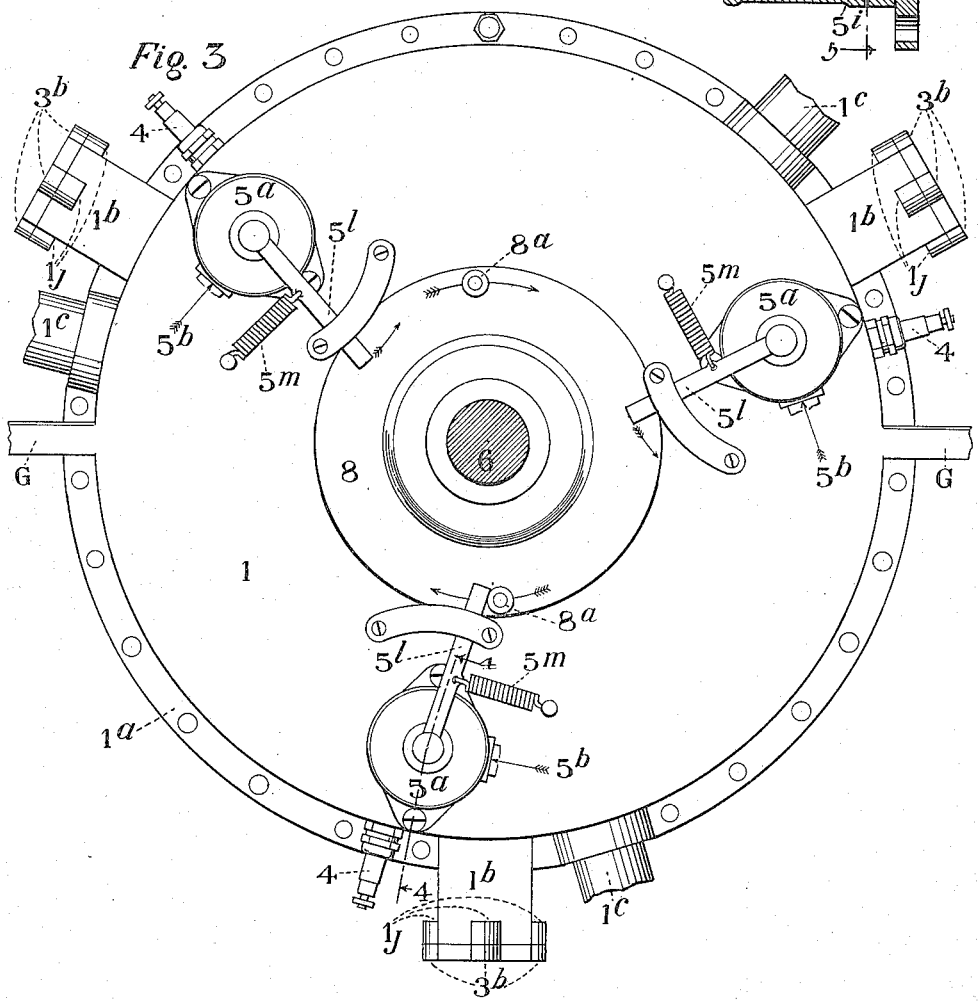

In the drawings Figure 1 is an interior view looking in the direction of the arrows 1—1 on Fig. 2, the right-hand portion of the casing shown in said figure being removed. Fig. 2 is an axial section of the engine taken as indicated at line 2—2 on Fig. 1. Fig. 3 is an exterior elevation showing the inlet valves and trip mechanism of the same. Fig. 4 is a section of an inlet valve taken as indicated at line 4—4 on Fig. 3. Fig. 5 is a section taken at line 5—5 on Fig. 4. Fig. 6 is a section taken at line 6—6 on Fig. 4. Fig. 7 illustrates that face of the movable gate which receives the impact of explosion. Fig. 8 is a detail of the said gate illustrating a friction roller contained therein. Fig. 9 is a top plan view of the gate looking in the direction of the arrow 9 on Fig. 7. Fig. 10 is an end view of the gate. Fig. 11 illustrates a cover plate for the gate pocket. Fig. 12 is a detail in perspective showing the forward side of a piston head. Fig. 13 is a detailed view showing a portion of the casing and gate pocket therein. Fig. 14 is a detailed section taken as indicated at line 14—14 on Fig. 13. Fig. 15 is a small side elevation of the engine indicating the general exterior appearance.

Essentially this engine comprises a stationary cylindrical shell or casing, a rotor consisting of a drum rigidly secured to a shaft journaled axially in the shell, the drum being provided with a series of piston heads extending outwardly to the interior surface of the cylindrical shell, and the shell having a series of movable gates or explosion heads carried in radial pockets and adapted to be thrust inward into the path of the piston heads for completing the closure of a chamber in which the explosion of the motive fluid may take place.

Referring to Figs. 1 and 2 of the drawings, it may be seen that the cylindrical shell is composed of two members, 1, 1, secured together by bolts passing through their abutting annular flanges $1^a$. Formed in the shell casting are three radial pockets, $1^b$, disposed at equal intervals around its periphery, designed to contain and guide the gates 2, and provided with cover plates 3, at their outer ends which extend beyond the main wall of the shell cylinder. At one side of each of the pockets $1^b$, the shell is apertured to receive a spark plug 4 which may be of any usual construction, and at the other side of the pocket there is formed in the shell casting an exhaust aperture, $1^c$, threaded for connection with an exhaust pipe. In one flat wall of the shell and adjacent to the points at which the spark plugs enter same, there are located the inlet ports, $1^d$, communicating with the exteriorly mounted inlet valves 5 shown in detail in Figs. 3 to 6 inclusive.

Each end wall of the cylindrical shell is thickened about the axis of the cylinder to form a journal bearing, $1^e$, for the engine shaft 6, to which is keyed the rotor 7, of the engine. This rotor consists of a hub $7^a$, a drum shaped portion $7^b$, connected with the hub by outwardly extending webs $7^c$, and radial vanes $7^d$, and having a pair of diametrically opposed piston heads $7^e$, extending outwardly from the drum to the interior curved wall of the cylindrical shell. The rotor is really journaled upon inwardly projecting annular flanges $1^f$, formed integrally with the casing shell and the explosion chamber is formed in the annular portion of the casing outside of this bearing flange $1^f$. At any given instant the walls of the explosion chamber comprise a part of the drum $7^b$, the nearly radial face $7^f$, of the piston head, an opposing face of one of the gates 2, and the curved wall of the shell cylinder together with its flat end portions. The gates 2, are designed to be thrust radially and inwardly against the drum $7^b$, by their springs $2^a$, and since this brings them into the path of the piston heads during their radial travel, there are provided inclined webs $7^g$, on the forward sides of piston heads and coöperating friction rollers $2^b$, pocketed in the inner ends of the gates, so that the gates may be readily thrust out of the path of piston travel by the pistons themselves in their passage.

Further description of the details of construction will be suspended at this point and the general operation of the engine will now be described.

Supposing the rotation of the shaft 6 to have been initiated in the direction of the arrow on Fig. 1, it will be seen that as one of the pistons $7^e$ passes one of the gates 2, the latter, under the force of its spring $2^a$, will quickly slip into position behind the piston, completing the closure of an annular chamber formed by the side walls of the housing, the drum portion of the revolving rotor and the interior curved face of the housing, this chamber being of variable volume according to the distance of the piston $7^e$ from the forward face of the gate, 2. Immediately upon closure of the chamber by the gate, 2, the inlet valve, 5, is automatically opened by means controlled by the rotation of the piston and hereinafter described, thus admitting to the chamber a supply of motive fluid under such pressure as adapts such motive fluid for ready explosion. A sufficient quantity of fluid having been admitted, the inlet valve closes and the charge is ignited by an electric spark occurring in a spark plug, 4, positioned as already noted and electrically connected with a suitable commutator or timer positively driven by the shaft of the engine. Under the force of the explosion the piston is driven away from the gate, 2, until it passes an exhaust aperture, $1^c$, through which the burnt gas is liberated. During the latter portion of the piston travel just preceding its passing of the exhaust aperture, the inclined shoulders, $7^a$, encounter the friction rollers, $2^b$, of the next succeeding gate, 2, and proceed to thrust the gate radially out of the path of the piston, to permit its passage, after which the above described cycle is repeated each time the piston encounters one of the gates, 2. In the engine as shown, with two pistons and three gates symmetrically disposed about the axis of the explosion cylinder, it will be seen that six explosions will occur during each revolution of the shaft,—that is, three explosions against each of the two pistons. The result is an overlap of successive explosions of approximately one-sixth of a revolution and a consequent torque of very satisfactory uniformity.

In the description of details the construction of the inlet valves, 5, will first be considered. It is the intention that the motive fluid shall enter the explosion chamber of this engine under the proper compression, instead of being compressed within the chamber, as is more usual in the reciprocating type of the explosive motor. For this reason it would be impracticable to employ puppet valves in the inlet ports, since the pressure on the valve acts sometimes from one side and sometimes from the other, according to conditions during different portions of the cycle of operation. If the ordinary form of puppet valve, opening inwardly, were employed, it would tend to open under pressure of the motive fluid outside the engine during the period of exhaust, especially toward the end of that period when the pressure within the chamber was reduced practically to atmospheric pressure. A convenient form of inlet valve for this type of motor is illustrated in Figs. 3 to 6 inclusive, in which $5^a$ is the valve shell having a threaded aperture $5^b$, adapted for connection with a motive fluid supply pipe and screwed onto a removable base portion, $5^c$, adapted to be secured to the casing shell. The base $5^c$ has a nipple $5^d$, tapered and adapted for connection with the inlet port $1^d$. Within the shell and shown as integral with the base portion there is a wall $5^e$, shown in detail in Fig. 5, having a series of apertures $5^f$, equally spaced about its center. A bushing $5^g$, carries the valve stem $5^h$, to the inner end of which is rigidly secured a disk $5^i$, having apertures $5^j$, corresponding to the apertures $5^f$, of the interior wall. This disk is illustrated in Fig. 6. It will be seen that the operation of the valve is accomplished by a slight rotation of the valve stem which causes the apertures $5^j$, to register with the apertures $5^f$, or to move out of registration with them, according to whether the valve is being opened or closed. A spring, $5^k$, maintains contact between the disk $5^i$ and the wall $5^e$, insuring perfect closure of the port when desired. A lever $5^m$, rigidly secured to the stem $5^h$, projects inwardly from the valve toward the engine shaft in position to contact with a roller $8^a$, carried by a disk 8, secured to the engine shaft 6. Rotation of the shaft thus automatically opens the valves at the time determined by the location of the rollers $8^a$ on the disk 8; and the closure of each valve is accomplished by a spring $5^m$ after the lever has swung out of contact with the roller $8^a$. The direction of rotation of the disk 8 is indicated by the arrows on Fig. 3, passing through the rollers $8^a$; the direction of movement of the valve levers for opening the valves is also indicated by arrows on Fig. 3 and the inlet pipes leading into the apertures $5^b$ are shown broken off,—the construction beyond this point being immaterial and not essential to the invention.

In this type of motor there is no necessity for a valve controlling each of the exhaust ports since at any given instant, the exhaust gas is separated from the live gas by one or both of the piston heads, the live gas occupying the space behind the piston head;—that is between its face, $7^f$, and the opposing face of the nearest one of the gates, 2,—and the burnt gas occupying the space directly ahead of the piston as far as the nearest gate, 2, or as far as the second gate, in case the piston has reached the position at which it has begun to raise the first gate out of its path by contact with the rollers, 2ᶜ. The exhaust ports, therefore are merely radial apertures formed in the flanges, 1ᵃ, of the casing shell, and threaded for connection with any convenient form of exhaust pipe which may or may not be extended to connect with a muffler if desired.

The exhaust is further facilitated by a peculiar construction of the rotor, as follows: The piston heads are made hollow and their cavities communicate with the space on either side of each of the webs 7ᶜ. Communication from side to side of these webs is afforded by the apertures, 7ʰ, in the webs, but the space is divided into two separate chambers by the four partitioning vanes, 7ᵈ, two of which are apertured as at 7ⁱ, and are therefore not true partitions. The vanes, 7ᵈ, are positioned approximately radially within the rotor drum, but only those portions standing between the two webs 7ᶜ, are in truly radial planes. At both sides of the rotor the vanes 7ᵈ, lean slightly toward the direction of rotation so as to constitute rotary suction fans, designed to draw air through the apertures, 1ᵍ, of the casing into interior chambers of the rotor, from which it may escape only through apertures, 7ʲ, in the forward sides of the piston heads. From this point the air will become mixed with the exhaust gases and will pass out with them through the exhaust ports 1ᵉ. This constant supply of fresh, and comparatively cool air, is calculated to assist in the cooling of the piston heads and of the combustion chamber walls, as well as to facilitate the removal of the exhaust gases.

As may be seen by reference to Figs. 13 and 14, the gates, 2, are carried in radial grooves, 1ʰ, which are virtually continuations inwardly of the pockets, 1ᵇ. The gates are made to fit closely in these grooves and pockets in order to accomplish the closure of the combustion chamber as perfectly as possible and it will be evident that with such construction, the compression of the air within the pocket which would result from movement of the gate therein, might tend to retard the action and heat the parts. For this reason, an air vent, 3ᵃ, is provided in the cover plate, 3, shown in Fig. 11. With this construction not only is the danger of overheating avoided, but, a positive cooling effect is obtained from the pumping action of the sliding gates, which furnishes to the interior of the pockets, 1ᵇ, and to the cavities of the hollow gates, 2, a constantly changing supply of fresh and cool air. This cover plate also carries lugs, 3ᵇ, for positioning the outer ends of the compression springs, 2ᵃ, and is secured to the main shell castings by screws or bolts passing into bosses, 1ʲ, exteriorly formed on the pockets.

In addition to the cooling effect obtained by passing fresh air through the combustion chambers and out through the exhaust ports with the burnt gases, it is found convenient and comparatively simple constructionally, to cast the shell members, 1, with water jackets as indicated at J.

The problem of packing a motor of this type differs widely from the problem presented in the usual reciprocating type of explosive motor in which practically all of the parts which must be made gas-tight are of cylindrical form and move along their axes, rather than revolving about them. In this motor, all but two of the packing elements are made with straight edges and flat wearing surfaces, the two exceptions being the rings, A, located in annular grooves in the bearing flanges, 1¹. The outer end of each piston head is provided with a packing strip, B, which has inwardly extending stems, B¹, contacting with the free ends of the flat springs, B², secured to the inner walls of the piston heads, and operating to thrust the packing strips, B, outward against the cylindrical wall of the shell. Strips of similar construction are provided at the sides of each of the gates, 2, as indicated at, C, springs, C², being mounted within the gates in position to engage the stems, C¹, for maintaining contact between the packing strips and the walls of the grooves, 1ᵇ, in which the gates are carried. The packing strips, D, for the sides of the piston heads are similar to those at C, except that they have in addition, members which may be termed lead stems, D¹, extending in the plane of the bearing surface of the packing strip and in the direction of rotation of the rotor. Near their forward ends these lead stems are pivotally secured in lugs, 7ᵏ, extending laterally from the webs, 7ᵍ. The length of these stems is slightly in excess of the width of the slots, 1ʰ, in which the gates, 2, are carried and it is the purpose of the lead stems to bridge these slots and guide the packing strips, D, safely across them without danger of becoming snagged, as they necessarily would be when thrust outwardly by their springs, D², if the lead stems were not provided. The forward ends of the stems are shown as slightly rounded to insure against their becoming snagged by the slots, 1ʰ, at these points. In addition to the strips, C, each of the gates, 2, is furnished with a packing strip, E, located in the forward face, which receives the impact of the explosion and which therefore must be made gas-tight at its line of contact with the face of the pocket, 1ᵇ. The spring, E², and contact stems, E¹, of this strip are shown in Fig. 9 of the drawings.

The oiling of the shaft journal bearings may be accomplished by any usual method, as may also the lubrication of the moving parts of the inlet valves, but for the accomplishment of this important function with respect to the interior of the shell and the wearing surfaces of the rotor, special means are provided comprising any usual type of force feed oil pump not shown, arranged to force lubricating oil through the tube, F, which connects with an aperture, $F^1$, in the shell at the slot, $1^h$, which is located near the bottom of the engine when the latter is mounted as indicated by the position of the securing lugs, G. Just before the rotor reaches the position at which it is shown in Fig. 1, and as the lowest gate, 2, is thrust downwardly by the inclined webs, $7^g$, of the rotor, the aperture, $F^1$, which is normally closed by the said gate, 2, is opened and a quantity of oil is shot under pressure into the annular chamber just ahead of the moving piston. The piston, by virtue of its close contact with the cylindrical wall of the shell, carries the oil with it as it rises in its rotation, leaving only a thin film of lubricant upon the casing wall. As the piston nears the highest point of its path, the oil which is pocketed between the piston near its outer edge and the wall of the shell, tends to flow down over the forward face of the piston and is caught in the pocket, H, provided therein for that purpose. Passing the high point of its path, the piston assumes a position at which the oil accumulated in this pocket tends to flow out again and in this way the remaining portion of the casing wall is lubricated just previous to the passage of the piston. In other words, the pistons are made to act as distributers for the oil which is injected into the annular chamber of the casing through the aperture, $F^1$. Except at the instant just previous to the passage of one of the pistons by this aperture, the aperture is closed, either by the piston itself, or by the gate, 2, which normally stands abutting the drum portion of the rotor. Through the sidewardly extending ducts, $H^1$, indicated in dotted lines in Fig. 12, the oil pockets, H, distribute the oil to the grooves in which the packing strips, B and D, are lodged, preventing the packing from becoming gummed and sticking in its grooves.

For constructional purposes it is found convenient to make the piston head with a removable forward wall, $7^m$, which is secured to the main rotor casting by screws, $7^n$, taking into those portions of the webs, $7^c$, which extend out into the hollow piston heads. This wall, $7^m$, contains the apertures, $7^j$, through which the cooling air is forced into the annular chamber of the shell, as already described. This construction also makes it possible to fasten the springs, $B^2$, to the cover-plate, $7^m$, while it is detached from the piston head, an operation which would be practically impossible if the piston head were of absolutely unitary construction.

Another important feature in the design of the piston heads is the shape of the wall which receives the impact of explosion and along which the gates, C, slide into position as it passes them. In order that the combustion chamber shall be practically gas-tight, the compression springs, $2^a$, must be made relatively stiff, so as to thrust the gates quite strongly against the drum-shaped wall of the rotor. To prevent this thrust from becoming a hammer action, which would cause rapid wear and malformation of the drum, the face, $7^f$, of the piston is inclined from a truly radial plane so as to be in contact with the edge of the gate, 2, throughout its movement inwardly to the drum. This sloping face, $7^f$, blends into the cylindrical surface of the drum, $7^b$, in a curve at, $7^o$, so that within the limits of the speed at which the rotor is intended to be run, the gates will slide gently though quickly into contact with the drum surface.

I claim:—

1. In a rotary explosive motor comprising a cylindrical shell, a drum journaled axially therein and having piston heads extending outwardly from its cylindrical surface to the cylindrical wall of the shell, and a series of movable gates adapted to coöperate with the piston heads to form explosion chambers, the drum and its piston heads being interiorly chambered, said chambers being in constant communication with the outside air, the shell being provided with exhaust ports and the piston heads having apertures arranged to furnish free access of air from the chamber of the drum through said exhaust ports during the exhaust portion of the engine's cycle.

2. In a rotary explosive motor comprising a cylindrical shell, a drum journaled axially therein having piston heads extending outwardly from its cylindrical surface to the cylindrical wall of the shell, the drum and its piston heads being interiorly chambered, the chamber of the drum being open to the outside air, and the piston heads having apertures leading from their chambers through their forward faces into the annular explosion chamber of the motor, said annular chamber being provided with exhaust ports leading to the outside air.

3. In a rotary explosive motor comprising a cylindrical shell, a drum journaled axially therein and having piston heads extending outwardly from its cylindrical surface to the cylindrical wall of the shell, the drum and its piston heads being interiorly chambered, the drum chamber opening to the outside air, the drum having webs in its ends arranged askew for drawing air into its chamber during its rotation, and the piston heads having apertures opening into the interior of the shell, said shell being provided with exhaust ports communicating with the outside air.

4. In a rotary explosive motor comprising a cylindrical shell, a drum journaled axially therein and having piston heads extending upwardly from its cylindrical surface to the cylindrical wall of the shell, the drum and its piston heads being interiorly chambered and open to the outside air, said drum having transaxial stiffening webs partitioning its chamber and apertured to afford intercommunication between the several parts thereof, said stiffening webs being supplemented at each end of the drum by approximately radial webs set slightly askew for drawing air through the chamber during rotation of the drum, the piston heads having apertures opening into the interior of the shell and having interior ribs extending into their chambers, and the shell being provided with a series of exhaust ports opening to the outside air.

5. In a rotary explosive engine comprising a cylindrical shell, a drum journaled axially therein and dimensioned to form an annular chamber between its outer surface and the inner cylindrical surface of the shell, the drum having piston heads extending outwardly into said annular chamber, a radial pocket in the shell, and a gate slidably mounted in said pocket for movement toward and from the cylindrical surface of the drum to coöperate with said piston heads for constituting an explosion chamber, said gate being interiorly chambered and having its outer surface grooved, a packing strip lodged in such groove and having a stem projecting into the interior chamber of the gate, and a spring mounted in said chamber for thrusting against said inwardly projecting stem, the outer end of the pocket being apertured to admit the outer air.

6. In a rotary explosive engine, a fixed cylindrical element and a rotary element journaled co-axially therewith, and the cylindrical surfaces of said elements being separated by an annular chamber, one of the elements having piston heads extending across said annular chamber to the other element, the other element having a series of radially movable gates, dimensioned to extend across the annular chamber to the first element, each of the aforesaid piston heads being formed with an inclined portion extending from the cylindrical surface of the drum to the contacting surface of the head, and the gates being provided at their extending ends with rollers, positioned to co-act with such inclined portions of the piston heads.

In testimony whereof I have hereunto set my hand at Chicago, Illinois, this 6th day of April, 1911.

BOHUMIL STRADOVSKY.

Witnesses:
ROBT. N. BURTON,
LUCY I. STONE.